United States Patent
Hijikata

(10) Patent No.: US 7,308,839 B2
(45) Date of Patent: Dec. 18, 2007

(54) ACCELERATOR PEDAL DEVICE

(75) Inventor: Shunsuke Hijikata, Kamakura (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 460 days.

(21) Appl. No.: 10/462,805

(22) Filed: Jun. 17, 2003

(65) Prior Publication Data

US 2003/0233902 A1    Dec. 25, 2003

(30) Foreign Application Priority Data

Jun. 20, 2002    (JP) ............................. 2002-180006

(51) Int. Cl.
*G05G 1/14*    (2006.01)

(52) U.S. Cl. ........................ 74/514; 180/271

(58) Field of Classification Search .......... 74/512–514, 74/560; 180/271, 274, 282; 701/36, 49
See application file for complete search history.

(56) References Cited

U.S. PATENT DOCUMENTS

| | | | | |
|---|---|---|---|---|
| 1,441,453 A * | 1/1923 | Rives | ........................... | 74/513 |
| 1,454,258 A * | 5/1923 | Adams | ......................... | 74/513 |
| 1,502,523 A * | 7/1924 | Peek | ........................... | 74/513 |
| 2,382,918 A * | 8/1945 | Rubissow | ..................... | 74/513 |
| 2,628,507 A * | 2/1953 | Juergens | ...................... | 74/513 |
| 2,936,867 A * | 5/1960 | Perry | ......................... | 477/216 |
| 3,630,326 A * | 12/1971 | Kawaguchi | ................. | 477/212 |
| 3,985,195 A * | 10/1976 | Tixier | ......................... | 180/168 |
| 4,356,740 A * | 11/1982 | Kubo et al. | .................... | 74/560 |
| 4,628,317 A | 12/1986 | Nishikawa et al. | | |
| 4,958,607 A * | 9/1990 | Lundberg | .................... | 123/399 |
| 5,113,721 A * | 5/1992 | Polly | ............................ | 477/80 |
| 5,215,057 A | 6/1993 | Sato et al. | | |
| 5,485,892 A | 1/1996 | Fujita | | |
| 6,070,490 A | 6/2000 | Aschoff et al. | | |
| 6,095,945 A | 8/2000 | Graf | | |
| 6,289,761 B1 * | 9/2001 | Reynolds et al. | ............. | 74/512 |
| 6,332,374 B1 * | 12/2001 | Someda et al. | ............... | 74/514 |
| 6,542,793 B2 | 4/2003 | Kojima et al. | | |

(Continued)

FOREIGN PATENT DOCUMENTS

DE    195 06 629    8/1996

(Continued)

OTHER PUBLICATIONS

Copending patent application entitled "Accelerator Pedal Device", Masahiro Egami, filed Jun. 13, 2003, our reference No. 61355-040.

(Continued)

*Primary Examiner*—Chong H Kim
(74) *Attorney, Agent, or Firm*—McDermott Will & Emery LLP

(57) ABSTRACT

An accelerator pedal device according to the present invention includes: a pedal lever that is provided so as to be rotatable with respect to a vehicle body; a pedal member that is actuated by being stepped upon by a driver; a rotation support device that rotatably supports the pedal member upon the pedal lever so that an angle subtended between the pedal lever and the pedal member is variable; and a reaction force application device that applies a reaction force to the pedal member via the pedal lever.

23 Claims, 13 Drawing Sheets

U.S. PATENT DOCUMENTS

| | | | |
|---|---|---|---|
| 2002/0020247 A1* | 2/2002 | Kojima et al. | 74/512 |
| 2002/0152831 A1* | 10/2002 | Sakamoto et al. | 74/512 |
| 2003/0060936 A1 | 3/2003 | Yamamura et al. | |
| 2003/0190996 A1 | 10/2003 | Yone | |
| 2003/0195684 A1 | 10/2003 | Martens | |
| 2004/0155811 A1 | 8/2004 | Albero et al. | |

FOREIGN PATENT DOCUMENTS

| | | |
|---|---|---|
| DE | 196 20 929 | 11/1997 |
| DE | 199 16 434 | 10/2000 |
| JP | 56-108953 | 8/1981 |
| JP | 56-108953 U | 8/1981 |
| JP | 57-033048 | 2/1982 |
| JP | 57-167845 | 10/1982 |
| JP | 62-51035 U | 3/1987 |
| JP | 63-258225 | 10/1988 |
| JP | 01119437 * | 5/1989 |
| JP | 02-291099 | 11/1990 |
| JP | 03-217627 | 9/1991 |
| JP | 05-231194 | 9/1993 |
| JP | 05-345536 | 12/1993 |
| JP | 7-4211 | 7/1995 |
| JP | H7-4211 U | 7/1995 |
| JP | 08-017000 | 1/1996 |
| JP | 08-168448 | 6/1996 |
| JP | 08-263160 | 10/1996 |
| JP | 09-254877 | 9/1997 |
| JP | 10-166889 | 6/1998 |
| JP | 10-166890 | 6/1998 |
| JP | 10-318009 | 12/1998 |
| JP | 10-338110 | 12/1998 |
| JP | 11-78595 | 3/1999 |
| JP | 2000-054860 | 2/2000 |
| JP | 2000-158970 | 6/2000 |
| JP | 2000-296724 | 10/2000 |
| JP | 2001-048034 | 2/2001 |
| JP | 2001-171497 | 6/2001 |
| JP | 2002-331850 | 11/2002 |
| JP | 2003-025870 | 1/2003 |
| WO | WO 03/039899 A2 | 5/2003 |

OTHER PUBLICATIONS

Copending patent application entitled "Driving Assist System for Vehicle", Nobuyuki Kuge et al., filed Jun. 13, 2003, our reference No. 61355-041.

Copending patent application entitled "Driving Assist System for Vehicle", Masahiro Egami, filed Jun. 13, 2003, our reference No. 61355-039.

* cited by examiner

FIG. 3A
FIG. 3B
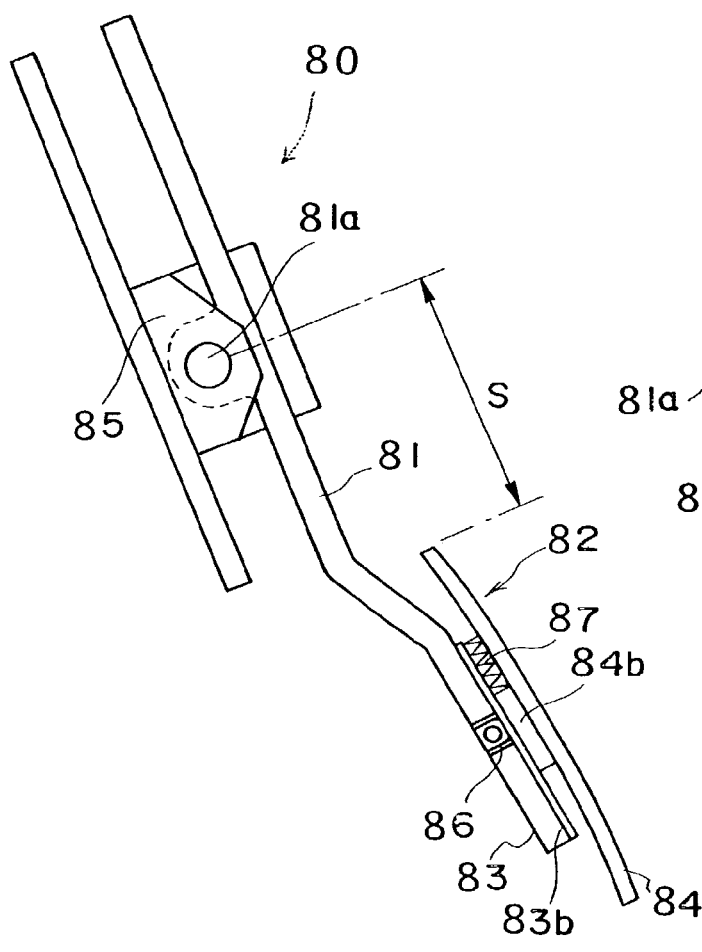
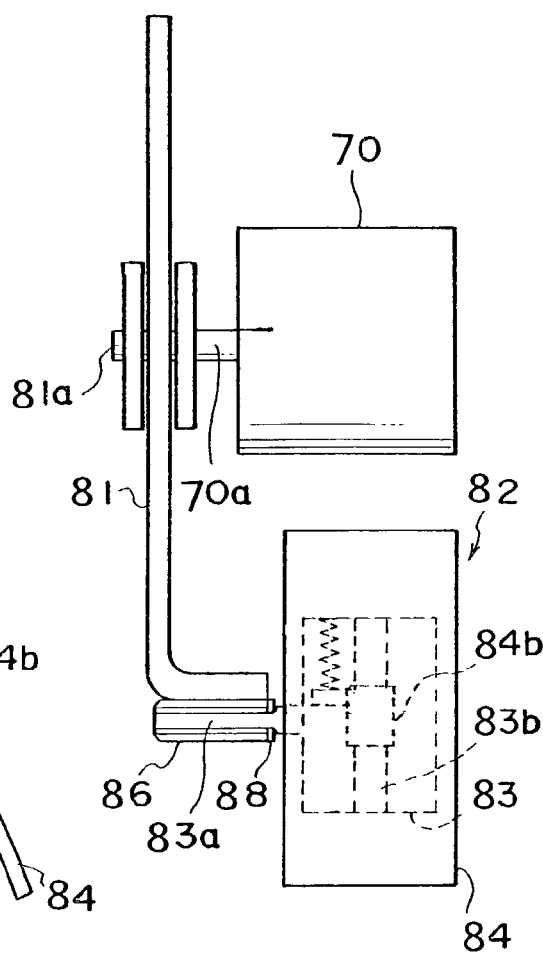
FIG. 3C
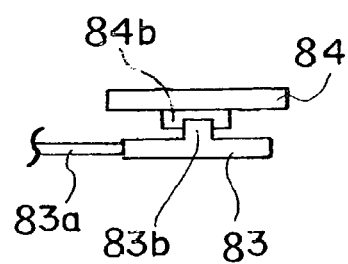

INITIAL STEPPING ON POSITION

INTERMEDIATE STEPPING ON POSITION

FULL STROKE STEPPING ON POSITION

INITIAL STEPPING ON POSITION

INTERMEDIATE STEPPING ON POSITION

ACCELERATOR PEDAL DEVICE

BACKGROUND OF THE INVENTION

1. Field of the Invention

The present invention relates to an accelerator pedal device which applies a reaction force to an accelerator pedal.

2. Description of the Related Art

In the past, as this type of device, there has been known, for example, the one disclosed in Japanese Laid-Open Patent Publication No. H11-78595. The device of this publication is one in which a motor is linked to the rotational shaft of the accelerator pedal, and reaction force is applied to the accelerator pedal via the motor according to various factors in the vehicle running environment such as the distance between vehicles and the radius of curvature of a curved road and the like, so that thereby setting of the vehicle speed is performed appropriately for the vehicle running environment.

SUMMARY OF THE INVENTION

However, the driver typically steps on the accelerator pedal with his heel serving as a fulcrum, while it is general for the rotational shaft of the accelerator pedal to be provided at a position which is higher than the accelerator pedal. Due to this, a mutual deviation occurs between the track of the foot of the driver as he steps down, and the track of rotational actuation of the accelerator pedal, and thereby, as the amount of depression of the accelerator pedal changes, the manner in which the driver experiences its reaction force also changes, so that it has been difficult for the driver to feel this reaction force accurately.

An accelerator pedal device according to the present invention comprises: a pedal lever that is provided so as to be rotatable with respect to a vehicle body; a pedal member that is actuated by being stepped upon by a driver; a rotation support device that rotatably supports the pedal member upon the pedal lever so that an angle subtended between the pedal lever and the pedal member is variable; and a reaction force application device that applies a reaction force to the pedal member via the pedal lever.

Another accelerator pedal device according to the present invention comprises: a pedal lever that is provided so as to be rotatable with respect to a vehicle body; a pedal member that is actuated by being stepped upon by a driver; a slide support device that slidably supports the pedal member upon the pedal lever so that a distance from a center of rotation of the pedal lever to the pedal member is variable; and a reaction force application device that applies reaction force to the pedal member via the pedal lever.

BRIEF DESCRIPTION OF THE DRAWINGS

FIGS. 3A-3C consist of an elevation view, a side view, and a bottom view, showing the structure of an accelerator pedal device according to this first preferred embodiment of the present invention.

DESCRIPTION OF THE PREFERRED EMBODIMENTS

The First Preferred Embodiment

In the following, the preferred embodiment of the accelerator pedal device according to the present invention will be explained with reference to FIGS. 1 through 10B.

Figure 1:
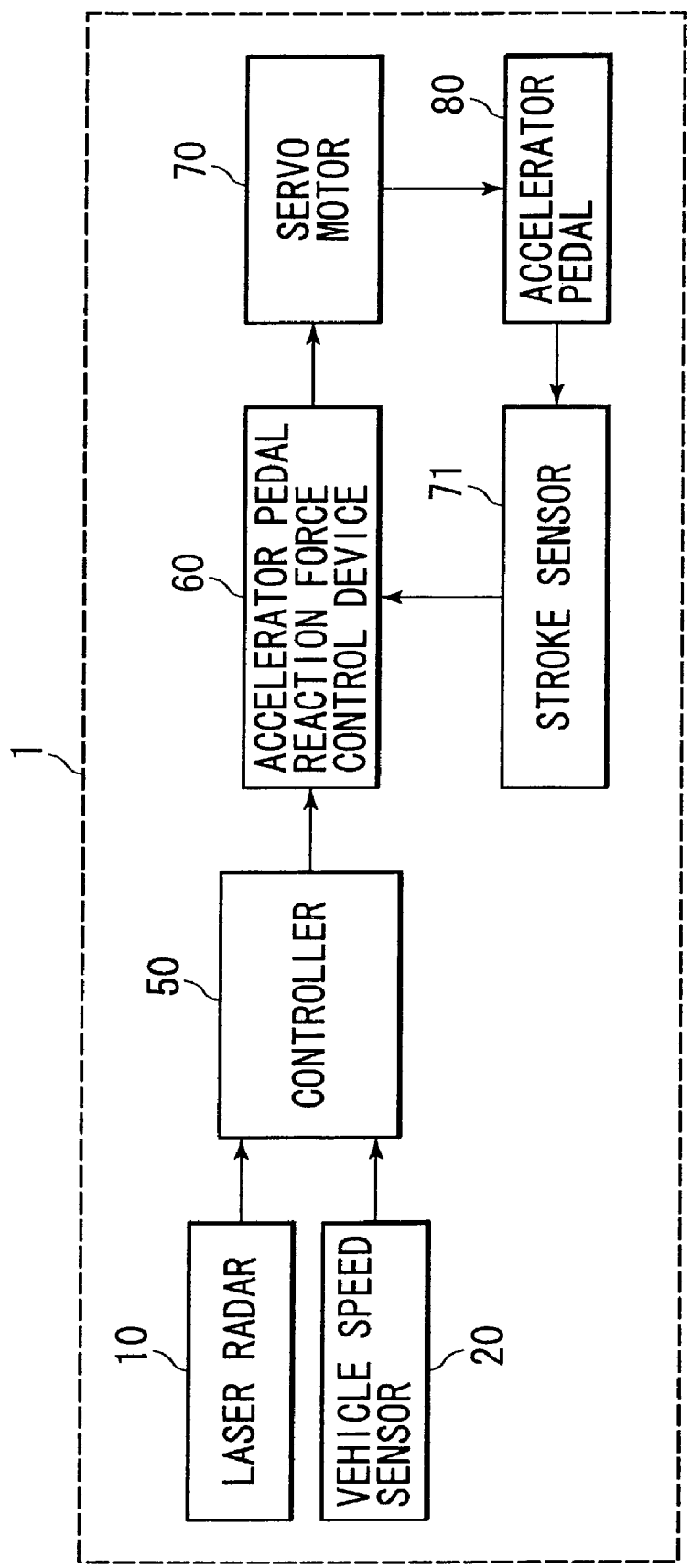
FIG. 1 is a system block diagram of a reaction force control device which includes an accelerator pedal device according to a first preferred embodiment of the present invention.
Figure 2:
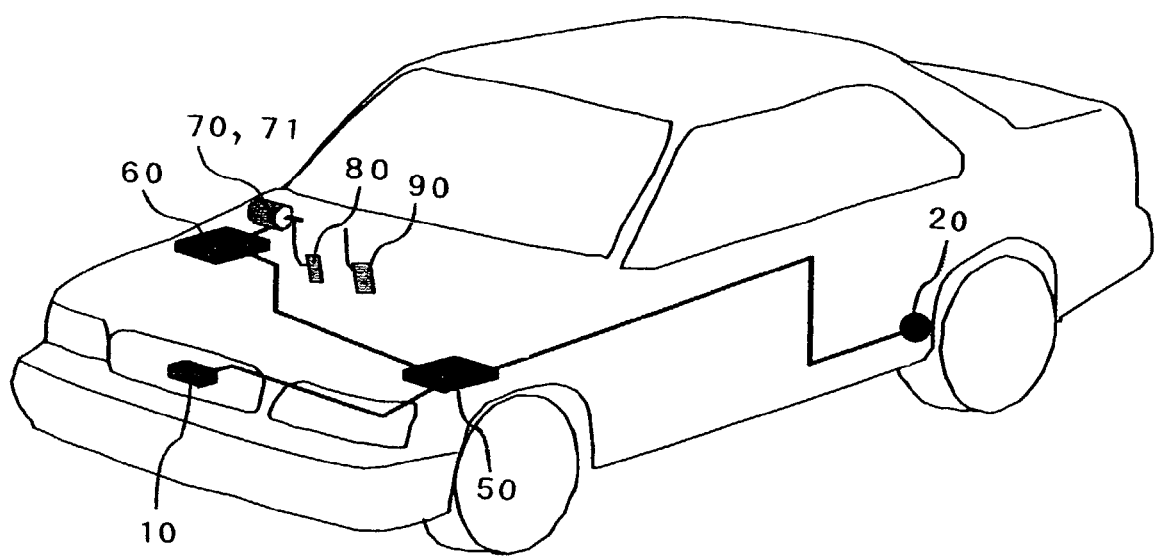
FIG. 2 is a perspective structural diagram showing a vehicle which is equipped with the reaction force control device of FIG. 1.

FIG. 1 is a system block diagram of a reaction force control device 1 which comprises an accelerator pedal device according to the preferred embodiment of the present invention, while FIG. 2 is a structural view of a vehicle which is equipped with this reaction force control device 1.

First, the structure of the reaction force control device 1 will be explained. A laser radar 10 is fixed to a grille portion or to a bumper portion or the like at the front of the vehicle, and emits and scans pulses of infrared light in the horizontal direction. Each of a plurality of reflective objects in front of the vehicle (normally the rear end of another vehicle in front) reflects back the infrared rays in these infrared light pulses, and the laser radar 10 measures these reflected waves and detects the distance to the vehicle in front (the distance between vehicles) and its relative speed based upon the arrival time of the reflected waves. The distance between vehicles and the relative speed which are thus detected are outputted from the laser radar 10 to a controller 50. The region in front of the vehicle which is scanned by the laser radar 10 is the region about ±6° on either side of the longitudinal line of the vehicle, and any object which is present in front of the vehicle in this region is detected in this manner. And a vehicle speed sensor 20 detects the running speed of the subject vehicle from the rotational speed of a wheel thereof or the like, and outputs this running speed to the controller 50. The subject vehicle means a vehicle to be controlled with the reaction force control.

The controller 50 calculates the degree of proximity to the vehicle in front which is running in front of the subject vehicle from the speed of the subject vehicle which are inputted from the vehicle speed sensor 20 and the distance between vehicles and the relative speed which are inputted from the laser radar 10, and estimates the current running situation of the subject vehicle. Furthermore it estimates how this running situation will change in the future, and outputs a reaction force command value to an accelerator pedal reaction force control device 60.

The accelerator pedal reaction force control device 60 controls the torque which is generated by a servo motor 70 which controls the accelerator pedal reaction force, according to the amount of actuation of the accelerator pedal 80 which is detected by a stroke sensor 71. According to the command value of the accelerator pedal reaction force control device 60, the torque which is generated by the servo motor 70 can be controlled, so that the reaction force which is generated when the driver actuates the accelerator pedal 80 can be controlled as desired.

FIGS. 3A-3B show an elevation view of the structure of an accelerator pedal 80 according to the first preferred embodiment of the present invention (FIG. 3A), a side view thereof (FIG. 3B), and a bottom view thereof (FIG. 3C). This accelerator pedal 80 comprises a pedal lever 81 which is supported via a bearing 85 so as to be rotatable with respect to the body of the vehicle, and a pedal portion 82 which is actuated by being stepped upon by the vehicle driver. A rotational shaft 81a of the pedal lever 81 is linked to the output shaft 70a of a servo motor 70, and thus the torque of the servo motor 70 is transmitted to the pedal lever 81.

The pedal member 82 comprises a base plate 83 and a pedal plate 84 which is overlapped on top of this base plate 83. A rotational shaft 83a of the base plate 83 is rotatably supported by a bearing 86 which is provided at the lower end portion of the pedal lever 81, so that the angle subtended between the pedal lever 81 and the base plate 83 (the angles θa through θc in FIGS. 9A through 9C) is variable. A rail 83b is provided upon the upper surface of the base plate 83 so as to extend in the direction perpendicular to the rotational shaft 83a, and a block 84b is provided upon the lower surface of the pedal plate 84 so as to be fitted upon this rail 83b. The pedal plate 84 is slidably supported upon the base plate 83 via the rail 83b and the block 84b, and the length S from the rotational shaft 81a of the pedal lever 81 to the pedal plate 84 is accordingly variable.

A tension spring 87 is interposed between the base plate 83 and the pedal plate 84 and extends along the direction of sliding. The end portions of the tension spring 87 are respectively connected to the base plate 83 and to the pedal plate 84 (the block 84b thereof), and the initial position of the pedal plate 84 with respect to the base plate 83 in the sliding direction is regulated by the spring force of the tension spring 87. Furthermore, a torsion spring 88 is interposed between the bearing 86 and the rotational shaft 83a of the base plate 83, and the initial rotational position of the base plate 83 with respect to the pedal lever 81 is regulated by the spring force of this torsion spring 88.

It should be understood that, in the above explanation, the pedal portion 82 constitutes a pedal member, the bearing 86 constitutes a rotational motion support means, the rail 83b and the block 84b constitute a slide support means, the servo motor 70 constitutes a reaction force application means, the base plate 83 constitutes a first pedal member, and the pedal plate 84 constitutes a second pedal member.

Next, the operation of this reaction force control device 1 according to the first preferred embodiment of the present invention will be explained. The summary of this operation is as follows.

The controller 50 recognizes the running situation or state such as the distance between vehicles (the distance to the vehicle in front of the subject vehicle), their relative speed, and the running vehicle speed of the subject vehicle, and, based upon this running situation, calculates the present degree of proximity to the vehicle in front (a first risk level), and the degree of influence upon the subject vehicle due to the trend of the future movement of the vehicle in front as predicted from the present (a second risk level). Furthermore, the controller 50 predicts the future running situation or state (a risk potential RP) from the degree of proximity and the predicted degree of influence which have thus been calculated, calculates an accelerator pedal reaction force command value ΔF based upon this risk potential RP, and outputs this command value ΔF to the accelerator pedal reaction force control device 60. The accelerator pedal reaction force control device 60 controls the servo motor 70 according to this command value ΔF, and thereby the stroke reaction force characteristic of the accelerator pedal 80 is changed.

Figure 4:
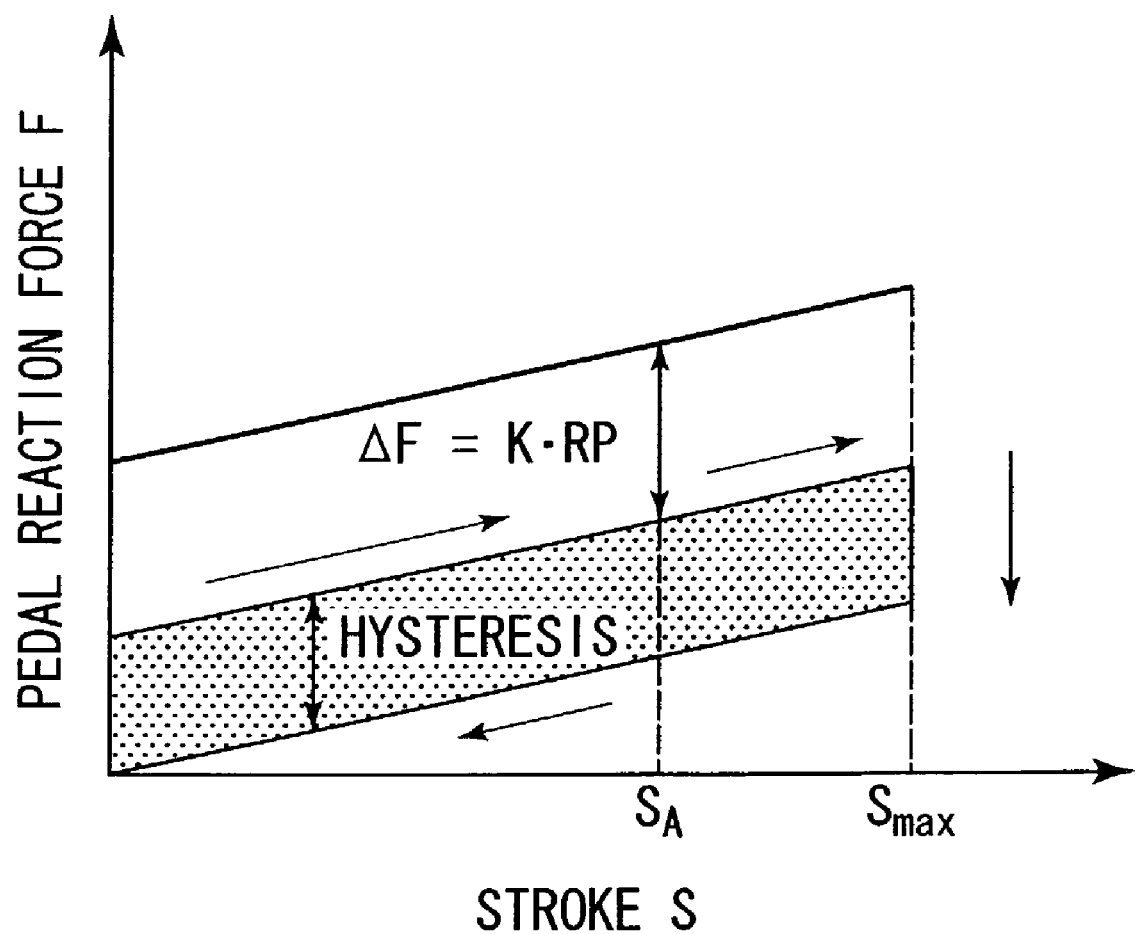
FIG. 4 is a figure showing a relationship between accelerator pedal stroke and reaction force in this first preferred embodiment of the present invention.

For example, with regard to the characteristic of stroke S versus pedal reaction force F as shown in FIG. 4, the normal state, in other words the reaction force characteristic when accelerator pedal reaction force control is not being performed by the reaction force control device 1, is given by the dotted portion, which exhibits hysteresis when the accelerator pedal 80 is stepped on and is released. This characteristic is determined by the characteristic of a return spring which is provided to the accelerator pedal 80 (for example a torsion spring which is provided upon the rotational shaft of the accelerator pedal 80). It should be understood that it would also be possible for such hysteresis to be generated according to torque control by the servo motor 70.

During reaction force control, the pedal reaction force F is generated which is increased by just the accelerator pedal reaction force command value ΔF. By doing this the reaction force F of the accelerator pedal 80 is made to correspond to the risk potential RP, so that it is possible to allow the driver to discriminate both the present and the future predicted operational situation of the vehicle from the accelerator pedal reaction force F.

Figure 5:
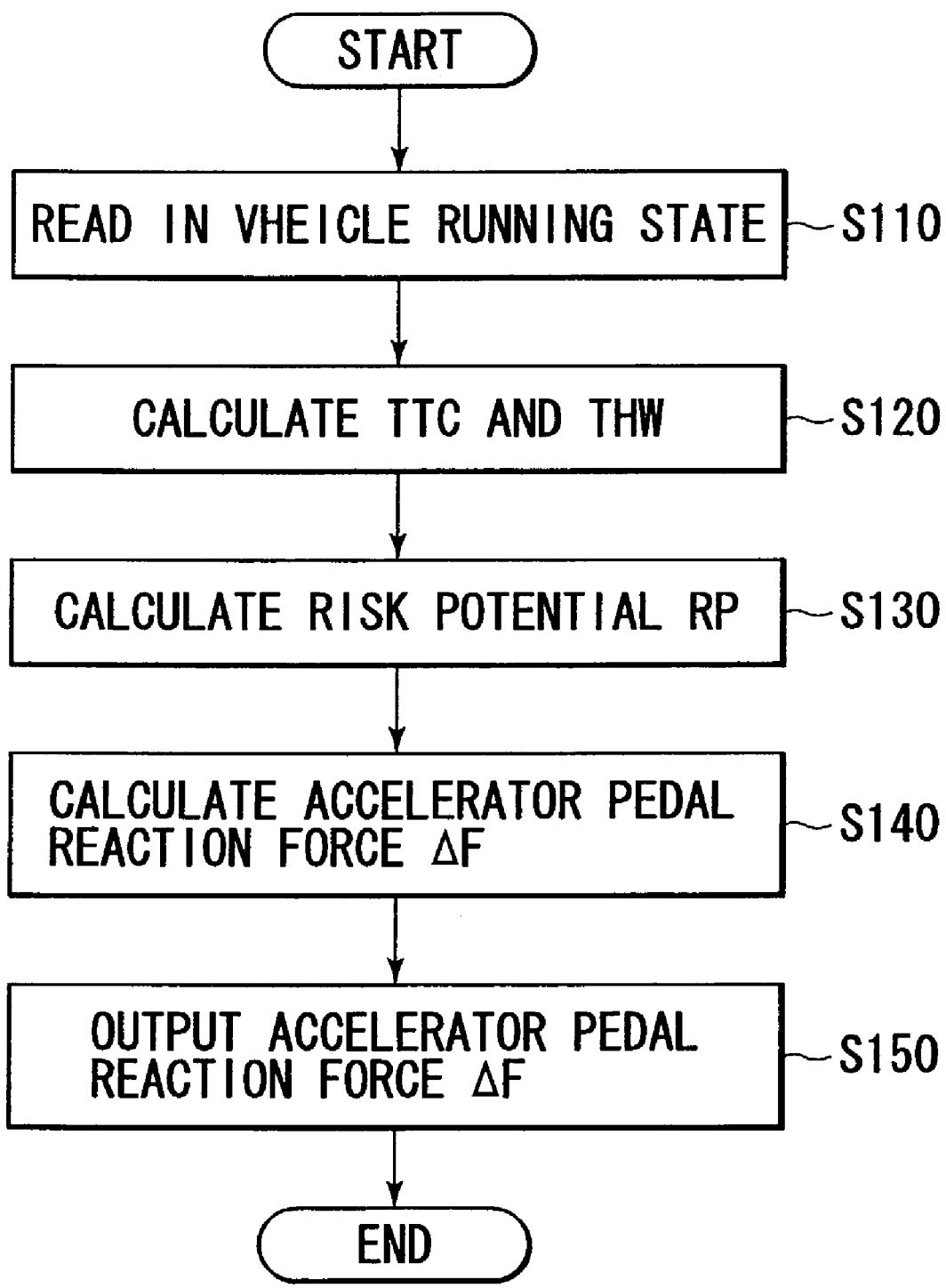
FIG. 5 is a flow chart showing the control flow of an accelerator pedal reaction force control program of this first preferred embodiment of the present invention.
Figure 6:
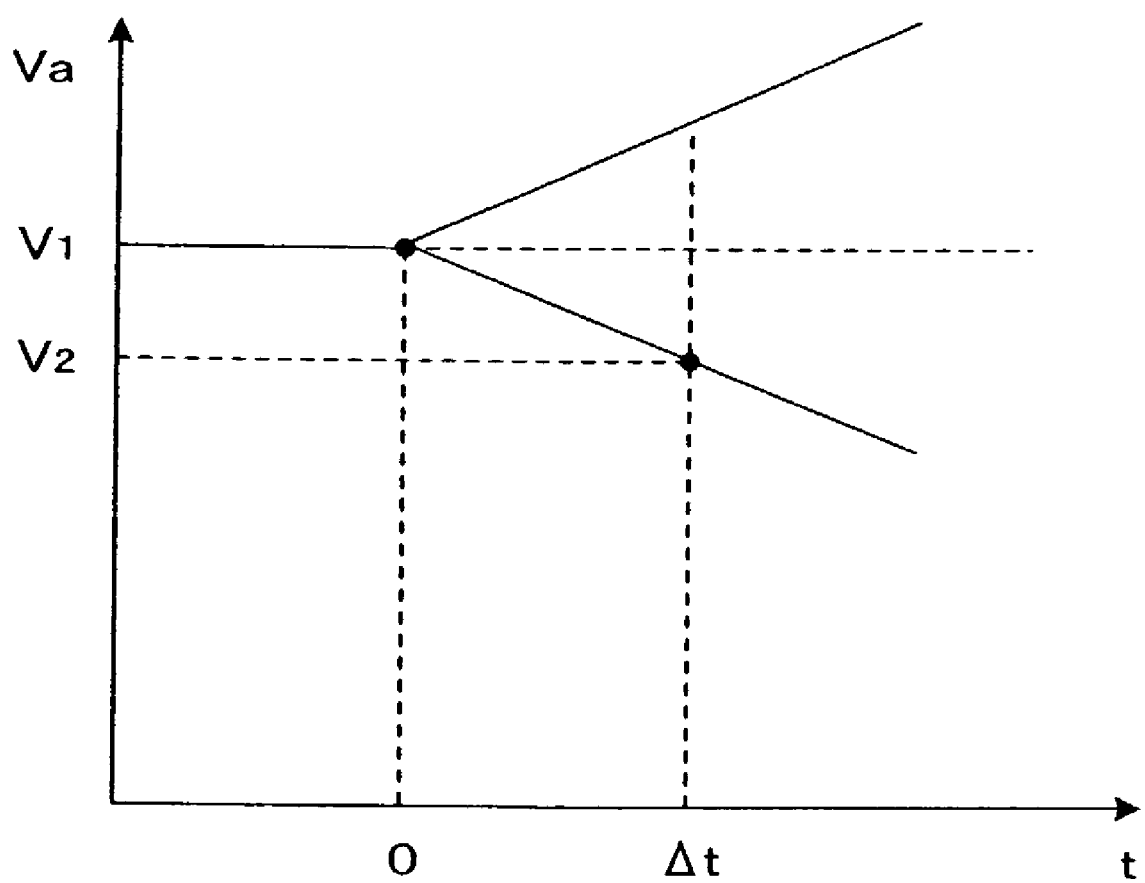
FIG. 6 is a figure showing variation of the future speed of the vehicle in front.

The method of determination of the accelerator pedal reaction force command value when performing this type of accelerator pedal reaction force control will now be explained in the following with reference to the flow chart shown in FIG. 5. It should be understood that FIG. 5 is a flow chart showing the processing flow of an accelerator pedal reaction force control program which is executed by the controller 50. The steps of this procedure are executed repeatedly at a fixed time interval of, for example, 50 msec.

—The Processing Flow of the Controller 50 (FIG. 5)—

First in the step S110 the vehicle running state, comprising the speed Vf of the subject vehicle, the distance D between vehicles to the vehicle in front, the relative speed Vr, and the speed of the vehicle in front Va, as detected by the laser radar 10 and the vehicle speed sensor 20, are read in.

In the next step S120, based upon this vehicle running state which has been read in, the present degree of proximity to the vehicle in front and the predicted degree of influence upon the subject vehicle due to change in the surrounding environment from now on are calculated. Here, a time to contact between vehicles TTC is calculated as the degree of proximity to the vehicle in front, while a time headway between vehicles THW is calculated as the predicted degree of influence. The time to contact between vehicles TTC may be referred to as a clearance time period between vehicles and the time headway between vehicles THW may be referred to as a time period between vehicles. In the following, this calculation of the time to contact between vehicles TTC and the time headway between vehicles THW will be explained.

The time to contact between vehicles TTC is a physical quantity that gives the current degree of proximity of the subject vehicle with respect to the vehicle in front. This time to contact between vehicles TTC is a value which gives whether or not, after a few seconds, if the present running situation is maintained, in other words if the subject vehicle speed Vf, the speed of the vehicle in front Va, and the relative vehicle speed Vr remain constant, the distance between vehicles D will become zero and the subject vehicle and the vehicle which is running in front of it will come into mutual contact; and it is obtained according to the following Equation (1):

$$\text{Time to contact between vehicles TTC} = D/Vr \quad \text{(Equation 1)}$$

The smaller is the value of the time to contact between vehicles TTC, the more acute is the contact with the vehicle in front, and this means that the degree of proximity to the vehicle in front is great. For example, when the subject vehicle approaches towards the vehicle in front, it is known that almost every driver will have started to perform deceleration operation before the time to contact between vehicles TTC becomes less than 4 seconds. Although, in this manner, the time to contact between vehicles TTC is a quantity which exerts a great influence upon the driving performance of the driver, it is difficult to express the risk which the driver feels with respect to contact with the vehicle in front only by this time to contact between vehicles TTC.

For example, if the subject vehicle is running so as just to track after the vehicle in front without catching it up, then its relative vehicle speed Vr with respect to the vehicle in front is 0, and the time to contact between vehicles TTC is infinitely large. However in this case the risk which the driver feels is different if the distance between vehicles D is long or if it is short, and in fact the driver feels that the risk is the greater, the shorter is the distance between vehicles D. This is considered to be because the driver predicts the amount of influence upon the time to contact between vehicles TTC which will be caused by the variation in the future of the vehicle speed of the vehicle in front which he hypothesizes, and feels the risk to be the greater, if he recognizes that this influence is large.

Furthermore, with the time to contact between vehicles TTC which has been calculated according to Equation (1), it has been supposed that the relative speed Vr is constant, but actually there is a possibility that after Δt seconds the relative speed Vr will have changed. For example, it is not of course possible to predict the running speed Va of the subject vehicle accurately after Δt seconds, but it is possible to predict that it will be endowed with some deviation such as that shown in FIG. 6. Here, when the vehicle running speed V2 after Δt seconds has become slower than the current vehicle running speed V1, along with this the relative vehicle speed Vr changes, and the time to contact between vehicles TTC after Δt seconds has a smaller value as compared with what would be the case if the relative vehicle speed Vr remained constant, so that the risk as felt by the driver is higher. However, it is difficult to determine this from the time to contact between vehicles TTC which has been calculated based upon the current relative vehicle speed Vr Thus, apart from the time to contact between vehicles TTC, if the subject vehicle is running so as just to track after the vehicle in front, the degree of influence upon the time to contact between vehicles TTC due to variation of the future vehicle speed of the vehicle in front which is hypothesized, in other words the degree of influence when it has been assumed that the relative vehicle speed Vr changes, is calculated. As the physical quantity which expresses the predicted degree of influence upon the time to contact between vehicles TTC, the time headway between vehicles THW which is given by one or the other of the following Equations (2) and (3) is used:

$$\text{Time headway between vehicles THW} = D/Va \quad \text{(Equation 2)}$$

$$\text{Time headway between vehicles THW} = D/Vf \quad \text{(Equation 3)}$$

This time headway between vehicles THW is the distance between vehicles D divided by the running speed of the vehicle in front Va or by the speed Vf of the subject vehicle Vf, and it represents the time period until the subject vehicle arrives at the current position of the vehicle in front. The greater is this time headway between vehicles THW, the smaller does the predicted degree of influence with respect to changes of the surrounding environment become. In other words, if the time headway between vehicles THW is great, even if in the future the vehicle speed of the vehicle in front changes, this will not exert a great influence upon the degree of proximity of the subject vehicle to the vehicle in front, so that the time to contact between vehicles TTC will not exhibit any very great change.

It should be understood that, since the time headway between vehicles THW is a value which expresses the degree of influence due to changes of the vehicle speed of the vehicle in front in the future, Equation (2) which uses the running speed Va of the vehicle in front is in better accordance with the risk which is experienced by the driver, than Equation (3) which uses the running speed of the subject vehicle Vf. However, since the running speed Va of the vehicle in front is calculated from the speed of the subject vehicle Vf and the relative vehicle speed Vr, accordingly it is possible to calculate the time headway between vehicles THW more accurately from Equation (2) which uses the subject vehicle speed Vf, which is detected with high accuracy by the vehicle speed sensor 20. It should be understood that, if the subject vehicle is running so as just to track after the vehicle in front, then Equation (2) is the same as Equation (3), since the subject vehicle speed Vf is equal to the running speed Va of the vehicle in front.

In the step S120 above, the time to contact between vehicles TTC and the time headway between vehicles THW are calculated. Next, in the step S130, the predicted future situation (the risk potential RP) is calculated based upon the time to contact between vehicles TTC and the time headway between vehicles THW which have thus been calculated in the step S120. This risk potential RP is given by the following Equation (4), and is a physical quantity which is given continuously as the sum of the degree of proximity to the vehicle in front (1/TTC) and the predicted degree of influence upon the future situation (1/THW), as adjusted by certain coefficients.

$$RP = a/THW + b/TTC \quad \text{(Equation 4)}$$

It should be understood that a and b are respective parameters for appropriately weighting the degree of proximity and the predicted degree of influence, and they are suitably set, with a<b. It is desirable for the values of a and b to be estimated from statistics relating to the time headway between vehicles THW and the time to contact between vehicles TTC, and they may, for example, be set to values around a=1 and b=8.

It should be understood that, as will be understood from the above described Equations (1) through (3), the time to contact between vehicles TTC is the risk level regarding how many seconds the subject vehicle will take to come into contact with the vehicle in front, when it is assumed that the relative speed Vr between the vehicle in front and the subject vehicle is constant, while the time headway between vehicles THW is the risk level regarding how many seconds the subject vehicle will take to arrive at the current position where the vehicle in front is located, when it is assumed that the relative speed Vr between the vehicle in front and the subject vehicle will change in the future. This time to contact between vehicles TTC and time headway between vehicles THW are individually calculated from the present subject vehicle speed Vf, the speed Va of the vehicle in front, and the relative vehicle speed Vr, but it is possible to estimate the risk potential RP which is predicted for the future by adjusting these using Equation (4).

The risk potential RP is possible to correspond to the continuous change of the situation from tracking after the vehicle in front until approaching to the vehicle in front, and it is possible to express the degree of proximity in these circumstances. In other words, it is possible to determine that, the greater is the risk potential, the greater does the driver feel the risk of perhaps coming too close to the vehicle in front in the future to be.

Figure 7:
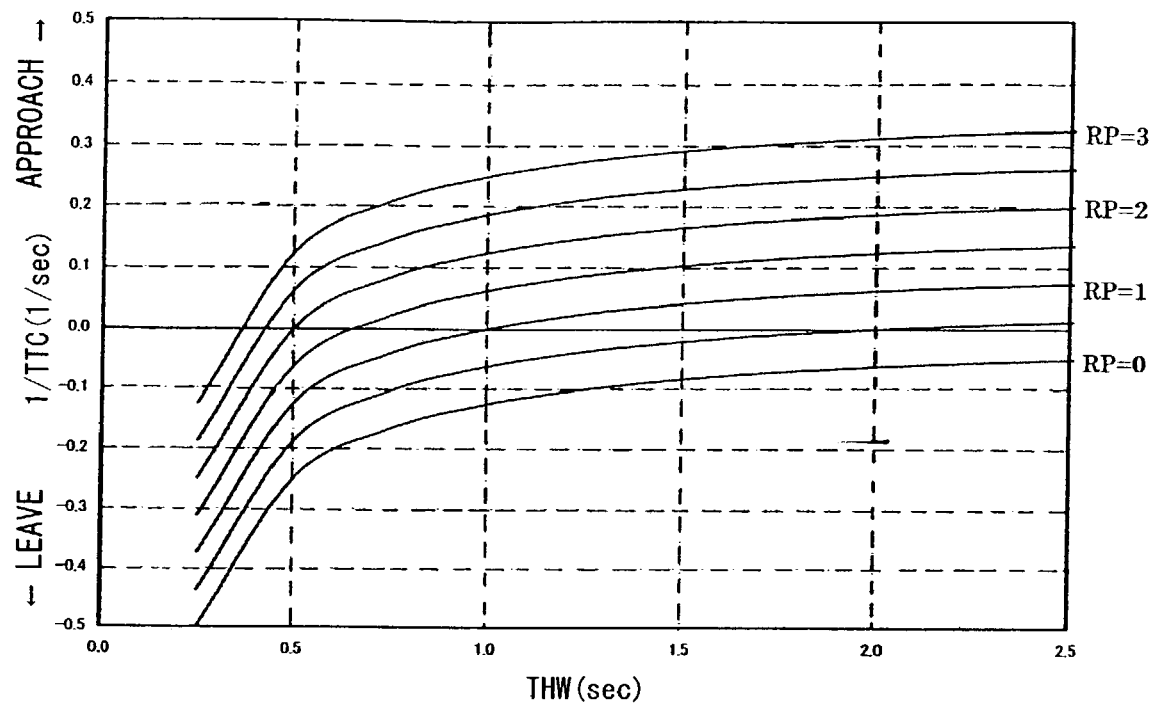
FIG. 7 is a figure showing operation provided by the reaction force control device of this first preferred embodiment of the present invention.

In FIG. 7, the risk potential RP which is calculated from Equation (4) is shown, in a planar chart of the time headway between vehicles THW against the reciprocal of the time to contact between vehicles (1/TTC), as each line has each value of the risk potential RP. In FIG. 7, the time headway between vehicles THW is shown along the horizontal axis, and the reciprocal (1/TTC) of the time to contact between vehicles TTC is shown along the vertical axis; and, the more to the right along the horizontal axis, the farther is the subject vehicle running from the vehicle in front, while, the more upwards along the vertical axis, the closer is the subject vehicle to the vehicle in front, while the lower therealong, the farther is it removed from the vehicle in front. In FIG. 7, each line of equal risk potential RP is drawn as a smooth line from the upper right to the lower left, and the value of the risk potential RP changes continuously between these lines of equal risk potential. It should be understood that the smaller is the time headway between vehicles THW and the greater is the reciprocal 1/TTC of the clearance time period, i.e. the more to the upper left of FIG. 7, the greater is the value of the risk potential RP. In other words, the closer to the vehicle in front and the greater is the degree of proximity thereto, the higher does the value of the risk potential RP assume. Furthermore, even if the degree of proximity 1/TTC has the same value, the shorter is the time headway between vehicles THW, the greater does the value of the risk potential RP become.

In the step S140, the accelerator pedal reaction force command value ΔF is calculated according to the following Equation (5), based upon the value of the risk potential RP which was calculated in the step S130:

$$\Delta F = K \cdot RP \quad \text{(Equation 5)}$$

Here, K is a constant value which should be set appropriately.

As shown in FIG. 7, the risk potential RP is given continuously for every running situation as defined by the time headway between vehicles THW and degree of proximity 1/TTC. By calculating the accelerator pedal reaction force command value ΔF using Equation (5), and by controlling the accelerator pedal reaction force according to the risk potential RP, it becomes possible to ensure that the degree of proximity to the vehicle in front is continuously recognized by the driver.

Next, in the step S150, the accelerator pedal reaction force command value ΔF which was calculated in the step S140 is outputted to the accelerator pedal reaction force control device 60, and then this episode of processing terminates.

In the step S130 described above, the value of the risk potential RP was calculated by weighting the present degree of proximity (1/TTC) and the predicted degree of influence (1/THW) individually and adding together with them using Equation (4). By doing this, it is possible to obtain the risk potential RP continuously even if the present degree of proximity or the predicted degree of influence change, and it is possible continuously to change the accelerator pedal reaction force which is set in correspondence to this risk potential RP. And it is possible for the driver accurately to recognize changes in the running situation of the vehicle from the accelerator pedal reaction force which changes smoothly and continuously.

It should be understood that the risk potential RP may also be calculated as shown in the following Equation (6):

$$RP = \max\{a/THW, b/TTC\} \quad \text{(Equation 6)}$$

In this case, as shown in Equation (6), the value of the maximum one among the degree of proximity (the reciprocal of TTC) to the vehicle in front and the predicted degree of influence (the reciprocal of THW) in the future state is selected as the value of the risk potential RP. It should be understood that a and b are parameters for weighting the degree of proximity and the predicted degree of influence respectively, and, for example, they may be appropriately set to around a=1 and b=8, with a<b. By doing this, it is possible to correspond to continuous change of the situation from tracking after the vehicle in front until approaching to the vehicle in front, and it is possible to express the degree of proximity in these circumstances.

Figure 8:
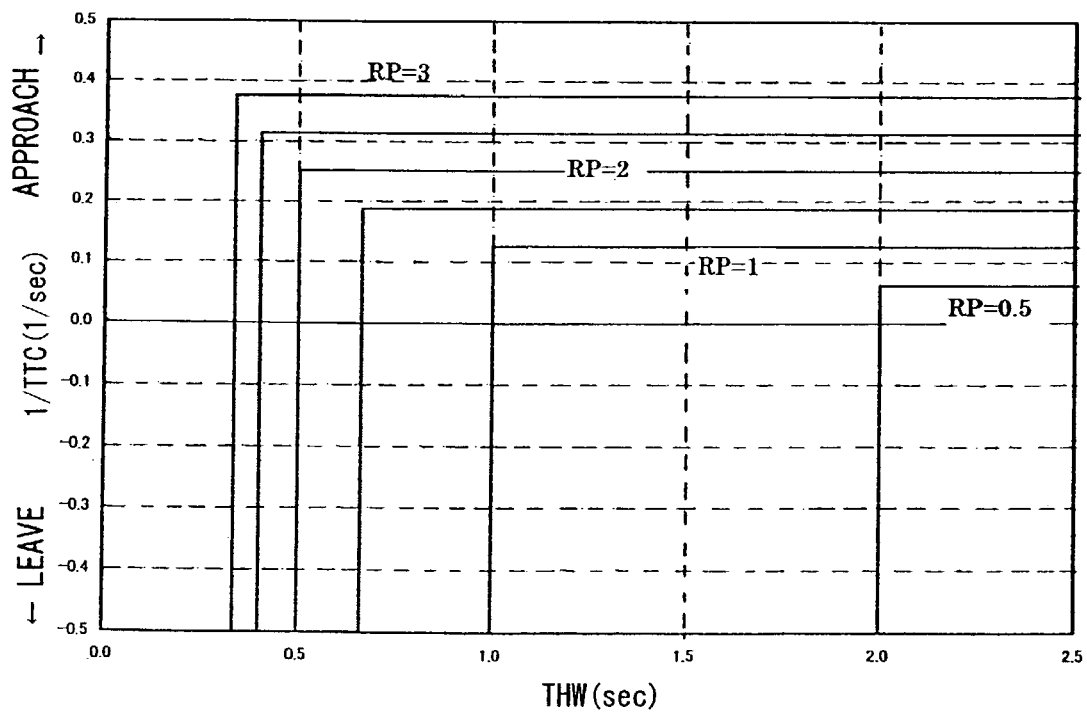
FIG. 8 is another figure showing operation provided by the reaction force control device of this first preferred embodiment of the present invention.

In FIG. 8, the risk potential RP which is calculated from Equation (6) is shown, in a planar chart of the time headway between vehicles THW against the reciprocal of the time to contact between vehicles (1/TTC), as each line has each value of the risk potential RP. In FIG. 8, just as in FIG. 7, the time headway between vehicles THW is shown along the horizontal axis, and the reciprocal (1/TTC) of the time to contact between vehicles TTC is shown along the vertical axis. As shown in FIG. 7, when calculating the risk potential RP using the above described Equation (4), at times such as when the relative speed Vr is negative so that the vehicle in front is moving faster than the subject vehicle and is getting farther away from it, even if the time headway between vehicles THW has the same value, the risk potential RP becomes extremely small. Along with this, the accelerator pedal reaction force command value ΔF also undesirably becomes extremely small.

On the other hand, in the value of the risk potential RP which has been calculated using Equation (6), the greater one of the present degree of proximity to the vehicle in front (1/TTC) and the predicted degree of influence (1/THW) in the future is selected. Due to this, even if the degree of proximity (1/TTC) is negative, in other words even if the relative vehicle speed is negative, the value of the risk potential RP does not drop below a predetermined value which is determined by the time headway between vehicles THW, as shown in FIG. 8. It should be understood that the time headway between vehicles THW is the time period for the subject vehicle to arrive at the current position of the vehicle in front, so that it can never have a negative value. Due to this, when the risk potential RP is calculated by using the above Equation (6), it is possible to prevent sudden change of the value of the risk potential RP, which would cause an undesirable sudden change of the accelerator pedal reaction force.

With this reaction force control device 1 according to this preferred embodiment of the present invention, the present degree of proximity to the vehicle in front (the time to contact between vehicles TTC) and the degree of influence due to change of the surrounding environment of the vehicle which is predicted for the future (the time headway between vehicles THW) are calculated, and these are added together with individual weightings in order to calculate the risk potential RP. And, by additionally applying a force which is proportional to this risk potential RP to the accelerator pedal reaction force, it becomes possible to control the reaction force of the accelerator pedal based upon a value which is close to the risk level which is actually felt by the driver of the vehicle. If the present degree of proximity to the vehicle in front is great (i.e. if the time to contact between vehicles TTC is small), or if the degree of influence for the future which is predicted is great (i.e. if the time headway between vehicles THW is small), then the risk potential RP becomes great, and a great accelerator pedal reaction force is generated in proportion to this relatively great risk potential RP. Due to this, when the degree of proximity to the vehicle in front is great so that the risk potential RP is great, the driver, who is stepping down upon the accelerator pedal 80, is induced towards releasing the accelerator pedal 80.

In concrete terms, by increasing the accelerator pedal reaction force, the driver is caused to recognize from this increased amount of reaction force the fact that the risk potential has increased, and by his own decision he is enabled to actuate (to release) the accelerator pedal to a satisfactory state. Furthermore, by increasing the accelerator pedal reaction force, the foot of the driver who is stepping down upon the accelerator pedal is naturally returned towards the release side, so that it is led towards a more satisfactory state, even though the driver does not particularly notice this fact. Yet further, since, by increasing the accelerator pedal reaction force, the necessary stepping upon force which is required when further stepping down upon the accelerator pedal from its current state of depression becomes greater, accordingly it is possible to restrain the driver from increasing the speed of the subject vehicle by further stepping down upon the accelerator pedal, so that it is possible to suppress further reduction of the distance between vehicles to the vehicle in front.

Moreover, if the accelerator pedal reaction force command value $\Delta F$ is determined based upon the risk potential RP which has been calculated using Equation (4), the risk potential RP changes continuously as shown in FIG. 7. Due to this, it is possible to cause the driver to recognize the vehicle running situation which corresponds to the degree of proximity 1/TTC to the vehicle in front and to the time headway between vehicles THW, via the accelerator pedal reaction force which is continuously transmitted to him. Furthermore, if the risk potential RP is calculated using Equation (6), the risk potential changes as shown in FIG. 8.

Due to this, even if the vehicle in front accelerates away from the subject vehicle so that the degree of proximity 1/TTC becomes extremely small, it is still possible to perform accelerator pedal reaction force control in a stabilized manner, since the risk potential RP never changes abruptly.

Yet further, since the time to contact between vehicles TTC and the time headway between vehicles THW can be calculated using physical quantities which are each comparatively easy to calculate, such as the subject vehicle speed Vf, the speed of the vehicle in front Va, the distance between vehicles D, and the like, accordingly it is possible to suppress increase in the number of component parts which are required for the construction of this driving actuation assistance device for a vehicle. Moreover, when setting the parameters a and b for calculation of the risk potential RP, by setting the parameter b for the time to contact between vehicles TTC to be greater than the parameter a for the time headway between vehicles THW, it is possible to calculate the risk potential while giving greater weighting to the present degree of proximity to the vehicle in front than to the degree of influence due to change of the surrounding environment of the vehicle in the future.

Next, the distinctive operation of this accelerator pedal device according to the first preferred embodiment of the present invention will be explained using FIGS. 9A-9C.

The point a in the figure is the action point (or the force application point) at which the force upon the pedal plate 84 from the sole of the foot of the driver acts, and the point b is the fulcrum (corresponding to the heel of his foot) around which the stepping on actuation provided by the driver turns. FIG. 9A shows the initial stepping on position of the accelerator pedal; FIG. 9B shows its intermediate position, and FIG. 9C shows its full stroke position.

Figure 9A:
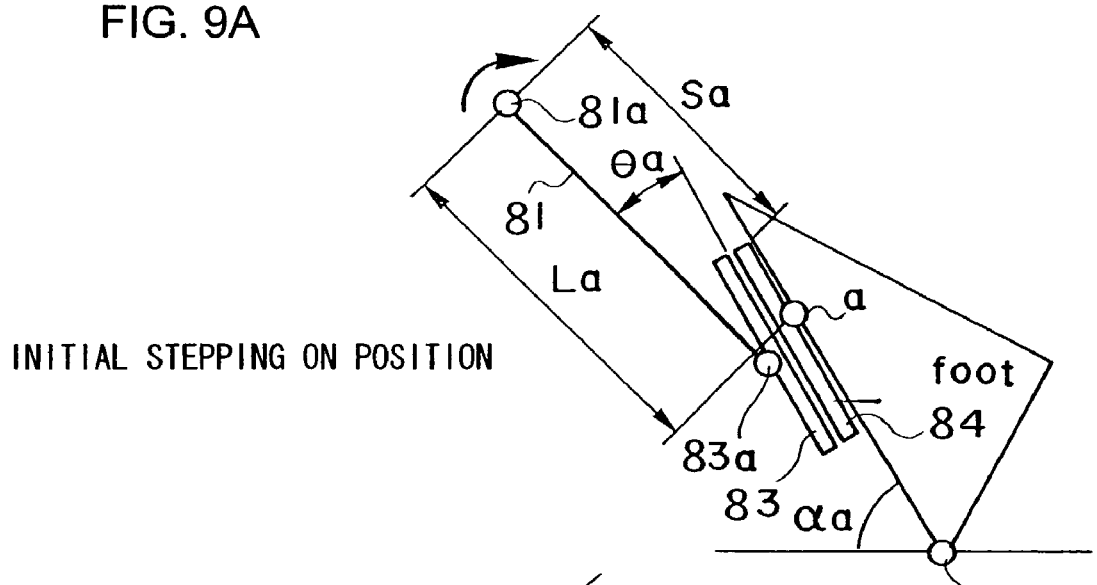
FIGS. 9A-9C are figures showing operation provided by the accelerator pedal device of this first preferred embodiment of the present invention.

When from the state of FIG. 9A the driver steps upon the pedal plate 84 around his heel b as a fulcrum, the angle $\alpha$ of the sole of his foot gradually diminishes ($\alpha a > \alpha b > \alpha c$), and the pedal lever 81 rotates around the rotational shaft 81$a$ as a fulcrum. At this time, the base plate 83 rotates with respect to the pedal lever 81, and the angle $\theta$ subtended between the base plate 83 and the pedal lever 81 gradually becomes small ($\theta a > \theta b > \theta c$). The angle $\theta$ includes plus or minus sign. The $\theta a$ in FIG. 9A has a plus value, the $\theta b$ in FIG. 9B has a plus value and the $\theta c$ in FIG. 9C has a minus value. Due to this, it is possible to ensure that the surface of the sole of the foot of the driver and the surface of the pedal always match with one another, so that it is possible to keep the position of the action point a on the surface of the sole of the foot of the driver almost constant. As a result, the distance from the rotational shaft 81$a$ of the pedal lever 81 to the action point a, in other words the length L of the moment arm, becomes almost the same irrespective of the amount of stepping on of the accelerator pedal (La=Lb=Lc), and it is possible for the driver to experience the reaction force F from the servo motor 70 accurately.

Figure 10A:
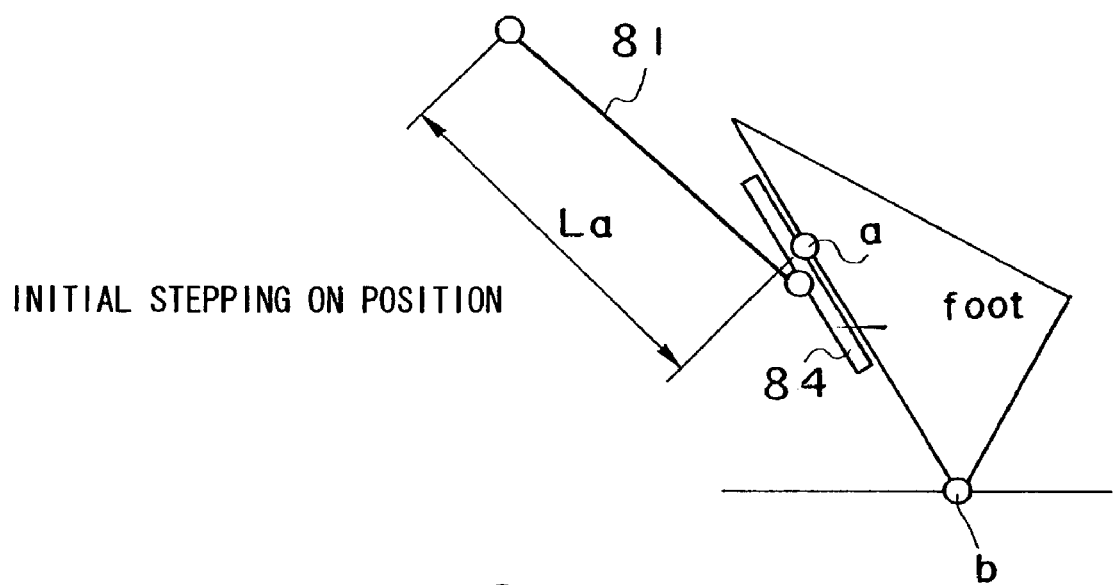
FIGS. 10A and 10B are figures showing the operation when an accelerator pedal which cannot be rotational is used.
Figure 10B:
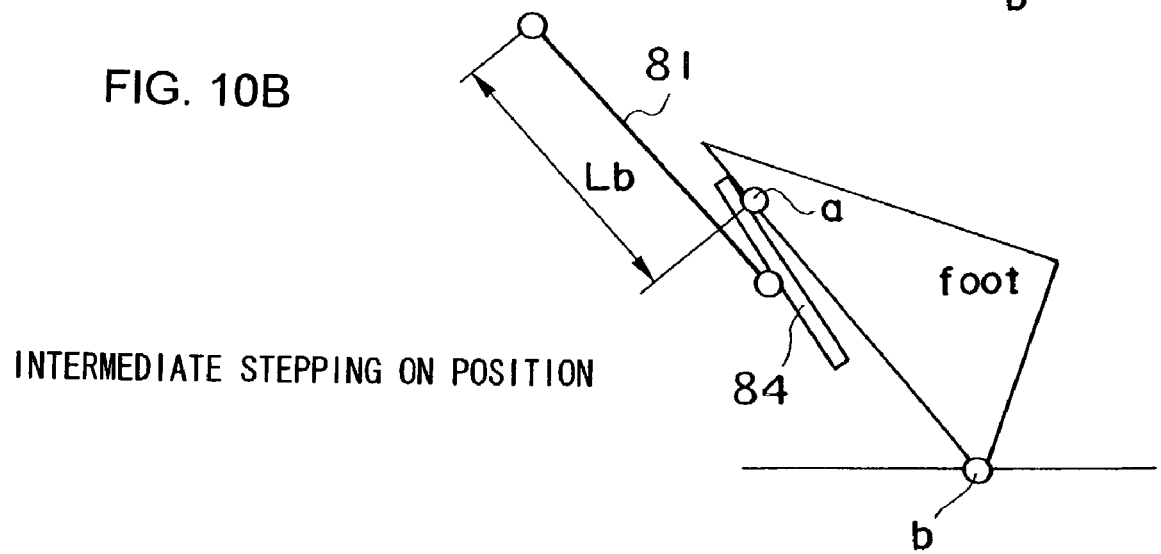

By contrast to this, if the pedal plate 84 were not to be rotatable, then as shown in FIGS. 10A and 10B, as the pedal was stepped upon, a deviation would take place between the surface of the sole of the foot of the driver and the surface of the pedal plate, and the position of the action point a would shift in the upward direction (towards the toes of the driver). Due to this the length L of the moment arm would become shorter (La>Lb), and the driver would come to experience the reaction force F from the servo motor 70 as being greater. As a result, the risk would not be accurately transmitted to the driver, and there would be a risk of him making an error in his assessment of the current risk.

Figure 9B:
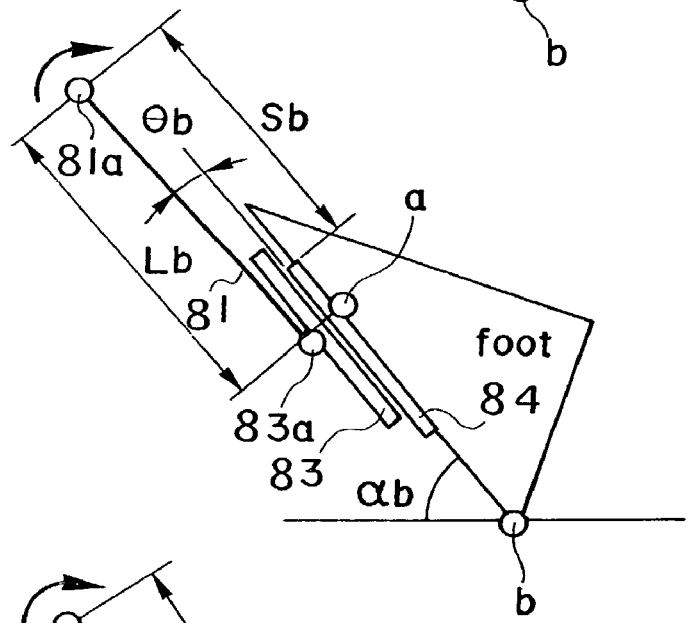
Figure 9C:
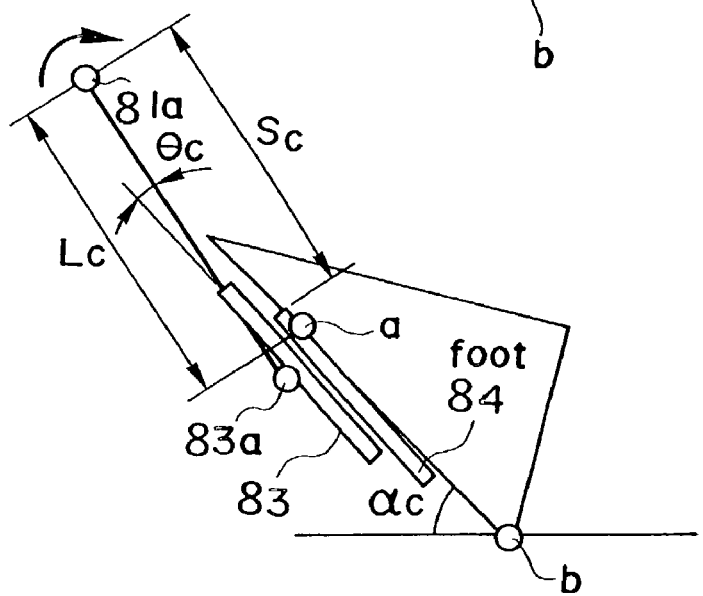

Furthermore, in this first preferred embodiment of the present invention, when the pedal plate 84 is stepped down upon, as shown in FIGS. 9A-9C, the pedal plate 84 slides with respect to the base plate 83, and the length from the rotational shaft 81a of the pedal lever 81 to the pedal plate 84 gradually becomes longer (Sa<Sb<Sc). Due to this, the shifting of the point of contact between the pedal plate 84 and the sole of the foot of the driver becomes smaller, an the driver can more easily experience the reaction force F. At this time, if the pedal were to be only rotatable, in order that the shifting of the contact point between the pedal plate 84 and the sole of the foot of the driver would be smaller, the position of the heel of the driver (the point b) would need to be shifted in the forward and backward direction. But, by supposing the pedal also to be slidable, it is possible to make the shifting of the contact point be much less, so that the position of the heel of the driver can be kept fixed. Furthermore, the shear or separating force between the upper surface of the pedal plate 84 and the sole of the foot of the driver is reduced, so that it is possible for the reaction force F from the servo motor 70 to act upon the driver as a perpendicular reaction force, and the driver can accordingly easily experience change of this reaction force.

According to this first preferred embodiment of the accelerator pedal device of the present invention, the following benefits are obtained.

(1) Since the base plate 83 is provided so as to be rotatable with respect to the pedal lever 81, it is possible to make the surface of the sole of the foot of the driver and the surface of the pedal plate match one another irrespective of the amount of actuation of the accelerator pedal, and it is possible to keep fixed the position of the action point a upon which the force bears. As a result, it becomes possible for the driver accurately to feel the reaction force F from the servo motor 70 according to the risk potential RP, so that it is possible for him accurately to apprehend the current value of the risk.

(2) Since the pedal plate 84 is provided so as to be slidable with respect to the base plate 83, accordingly the shifting of the contact point between the pedal and the sole of the foot of the driver is reduced, and thus it becomes possible to reduce the shear or separating force between them. As a result, the driver can more easily sense the reaction force.

(3) Since the base plate 83 is provided so as to be rotatable with respect to the pedal lever 81, and the pedal plate 84 is provided so as to be slidable with respect to the base plate 83, accordingly it is possible for the driver to perform stepping upon actuation in the state in which the pedal plate 84 is closely contacted against the sole of his foot, and, to a further degree, it becomes easy for him to feel the reaction force from the servo motor 70.

(4) Since the pedal portion 82 is formed by overlapping the two plates 83 and 84, accordingly it is possible easily to provide two degrees of freedom with respect to the pedal lever 81, i.e. both sliding and rotational movement with respect thereto.

The Second Preferred Embodiment

The second preferred embodiment of the accelerator pedal device according to the present invention will now be explained with reference to FIGS. 11A through 14B. In the first preferred embodiment described above, the pedal plate 84 was provided so as to be slidable with respect to the base plate 83, but, in this second preferred embodiment, the sliding of the pedal plate 84 is prevented in correspondence to the risk potential.

Figure 11A:
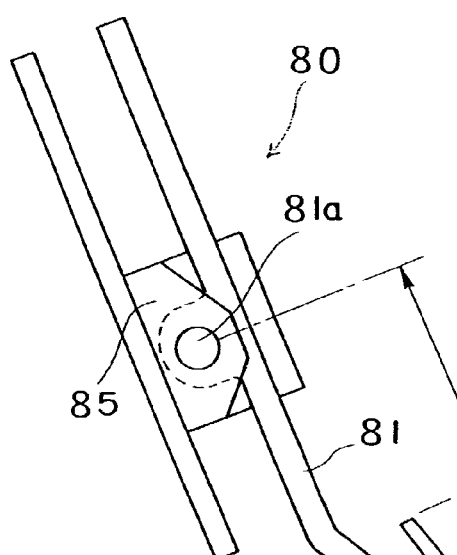
FIGS. 11A-11C consist of an elevation view, a side view, and a bottom view, showing the structure of an accelerator pedal device according to a second preferred embodiment of the present invention.
Figure 11B:
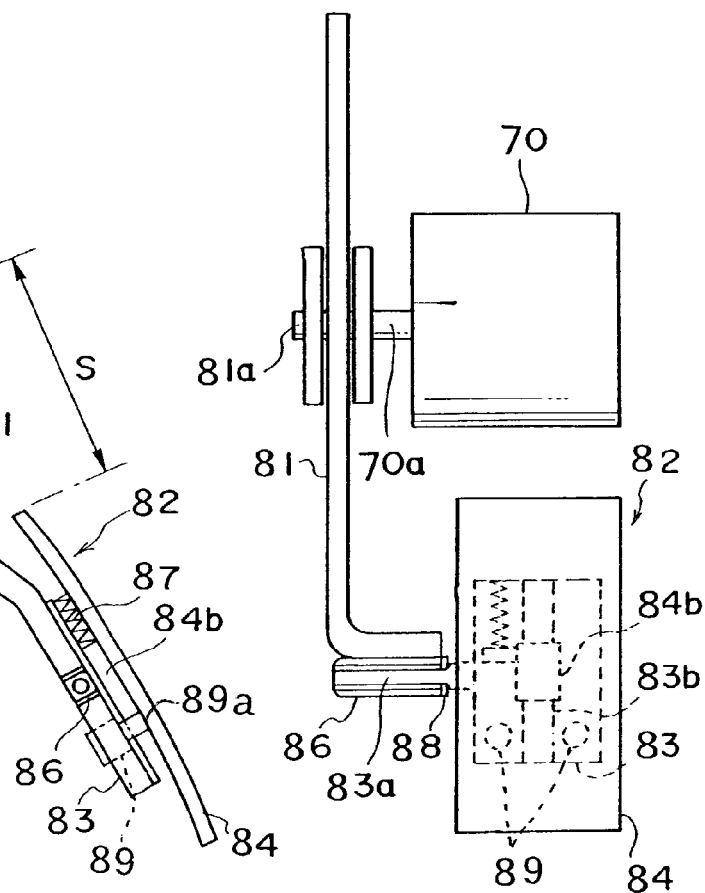
Figure 11C:
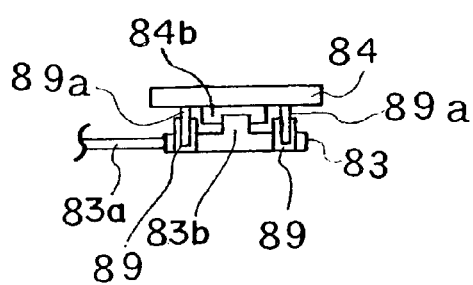

The feature by which this second preferred embodiment differs from the first preferred embodiment is that a slide control actuator is provided to the pedal portion 82. FIGS. 11A through 11C are figures showing the structure of an accelerator pedal device according to this second preferred embodiment. It should be understood that to portions which are the same as ones illustrated in FIGS. 3A through 3C the same reference symbols are appended, and the following explanation will principally focus upon the points in which this second preferred embodiment differs from the first. A solenoid 89 of the direct acting type is housed in the base plate 83, and serves as a slide control actuator. When the solenoid 89 is turned OFF (is not magnetized), then the upper end of the solenoid pin 89a is separated from the lower surface of the pedal plate 84, while, when the solenoid 89 is turned ON (is magnetized), then the upper end of the solenoid pin 89a is contacted against the lower surface of the pedal plate 84.

Figure 12:
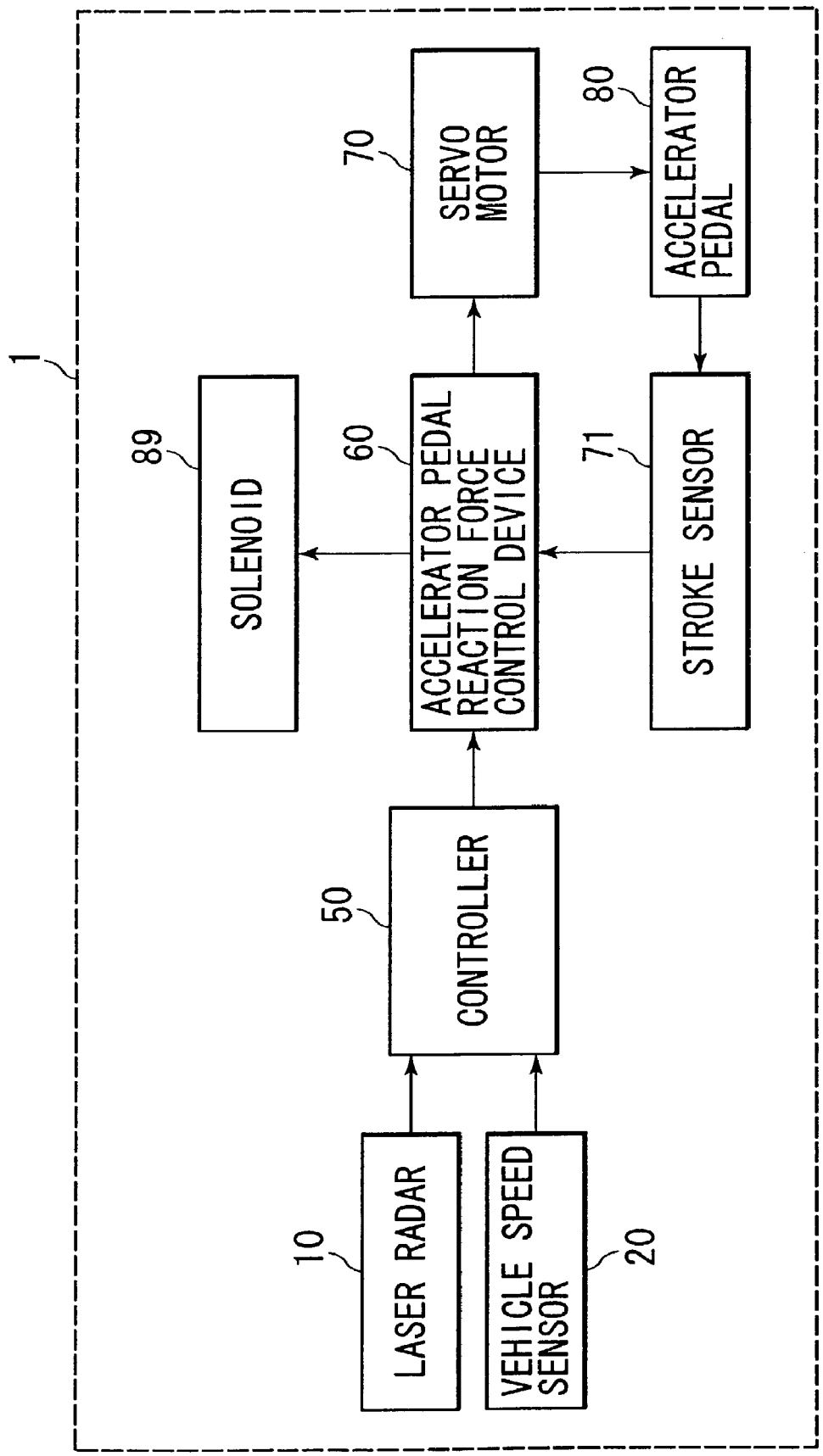
FIG. 12 is a system block diagram of a reaction force control device which includes an accelerator pedal device according to this second preferred embodiment of the present invention.

FIG. 12 is a system block diagram showing the structure of a reaction control device according to this second preferred embodiment of the present invention, which comprises an accelerator pedal device. It should be understood that to portions which are the same as ones illustrated in FIG. 1 the same reference symbols are appended. In FIG. 12, the accelerator pedal reaction force control device 60 In FIG. 12, the accelerator pedal reaction force control device 60 outputs to the servo motor 70 a reaction force command which corresponds to the risk potential PR which is calculated by the controller 50. Furthermore, the accelerator pedal reaction force control device 60 turns the solenoid 89 ON or OFF according to the risk potential RP.

Figure 13:
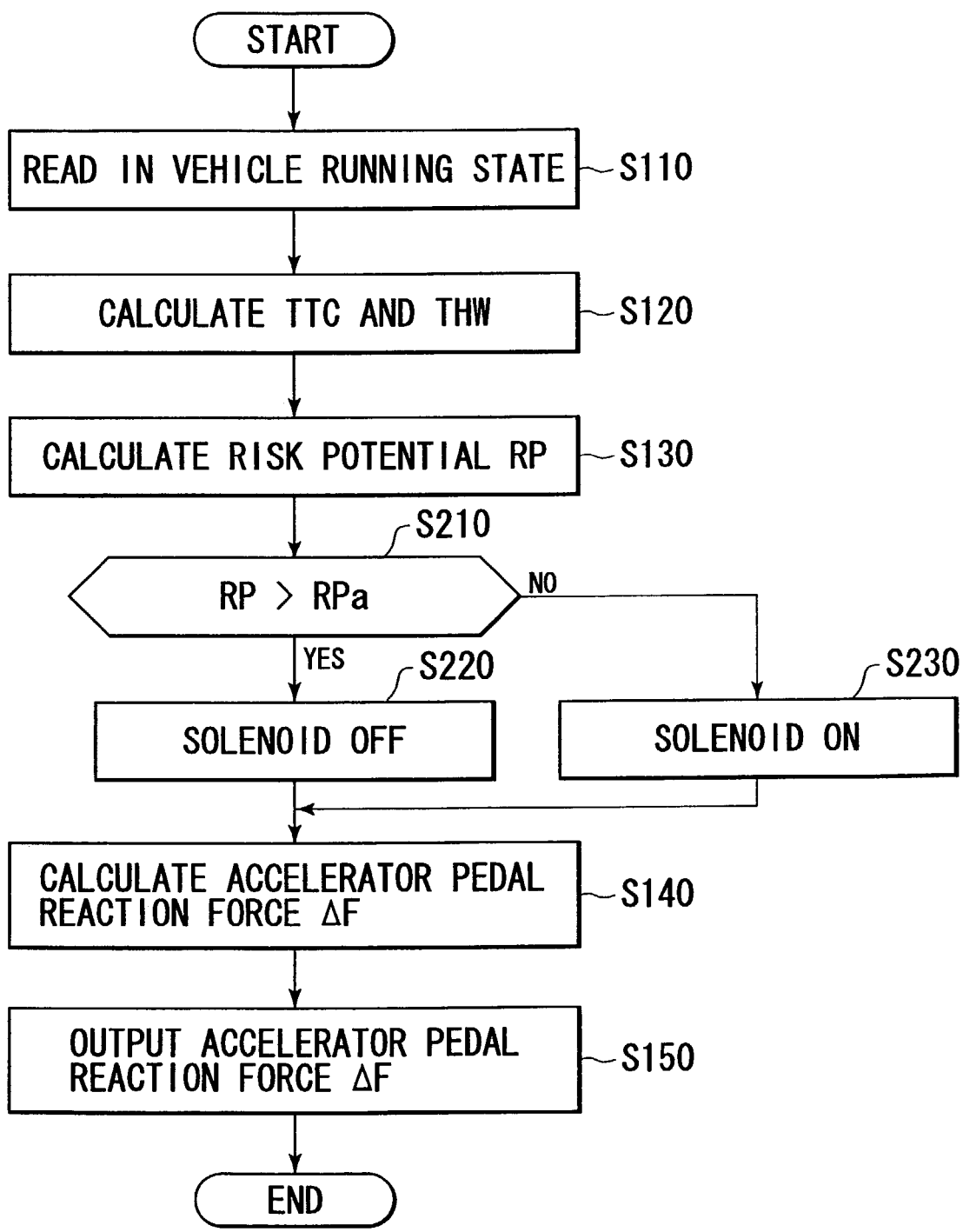
FIG. 13 is a flow chart showing the control flow of an accelerator pedal reaction force control program of this second preferred embodiment of the present invention.

FIG. 13 is a flow chart showing the processing flow of an accelerator pedal reaction force control program according to this second preferred embodiment. It should be understood that, in this flow chart, to steps which correspond to ones shown in FIG. 5 the same reference symbols are appended, and the following explanation will focus upon the points of difference from the first preferred embodiment. In the step S130, the risk potential is calculated, and then the flow of control proceeds to the step S210, in which a decision is made as to whether or not this risk potential RP which has been calculated is greater than a predetermined value RPa of risk potential. If it is decided that indeed RP>RPa, then the flow of control is transferred to the step S220, and the solenoid 89 is turned OFF. Next in the step S140 the reaction force ΔF is calculated according to the risk potential RP. On the other hand, if in the step S210 it is decided that in fact RP RPa, then the flow of control is transferred to the step S230, and the solenoid 89 is turned ON.

It should be understood that, in the above explanation, the solenoid 89 constitutes a slide prevention means, while the accelerator pedal reaction force control device 60 constitutes a slide control means.

Figure 14A:
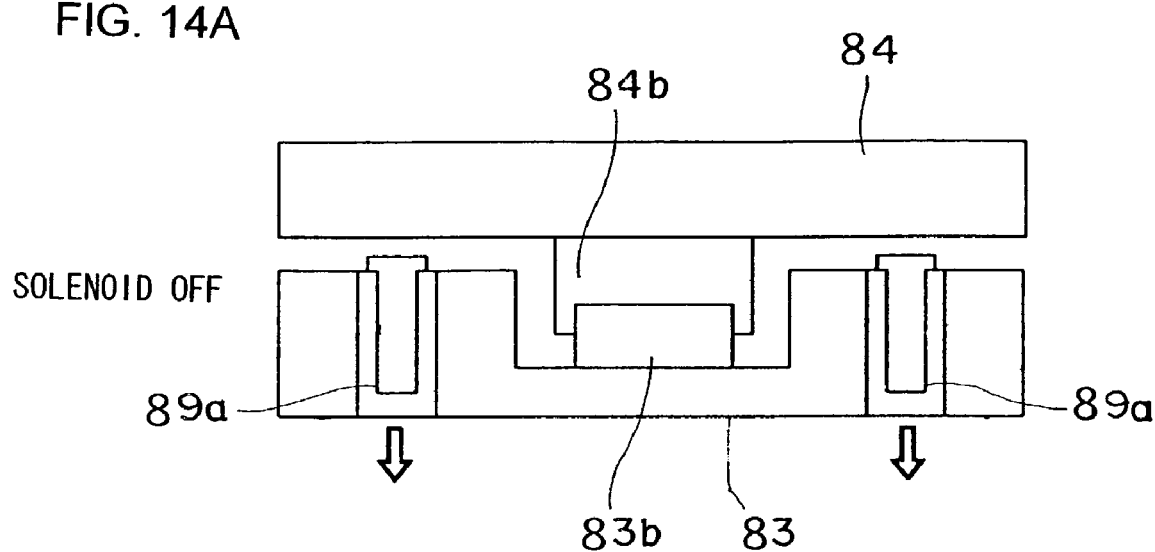
FIGS. 14A and 14B are figures showing operation provided by the accelerator pedal device of this second preferred embodiment of the present invention.

The distinctive action of this accelerator pedal device according to the second preferred embodiment of the present invention will now be explained. When, due to change in the running situation in the environment of the vehicle, the value of the risk potential RP which is calculated by the controller 50 comes to exceed the predetermined value RPa, the solenoid 89 is turned OFF (in the step S220). Due to this, as shown in FIG. 14A, the solenoid pin 89a is withdrawn from the lower surface of the pedal plate 84, and the pedal plate 84 is accordingly permitted to slide. As a result, it is possible for the driver accurately to experience the reaction force from the servo motor 70, so that it is possible for him to accurately recognize the risk of the subject vehicle.

Figure 14B:
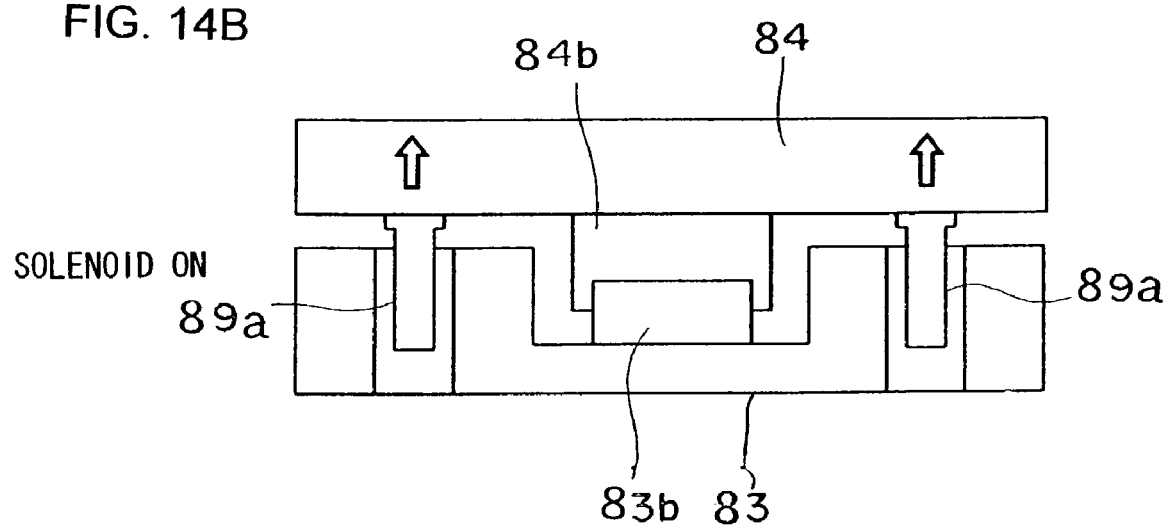

On the other hand, if the risk potential RP which is calculated by the controller 50 is less than the predetermined value RPa, the solenoid 89 is turned ON (in the step S230). Due to this, as shown in FIG. 14B, the end portion of the solenoid pin 89a is contacted against the lower surface of the pedal plate 84, and the sliding of the pedal plate 84 is prevented due to the frictional force engendered thereby. As a result, the actuation of the pedal plate 84 becomes easily transmitted to the pedal lever 81, and, along with enhancing the actuatability of the accelerator pedal, it also becomes easy to implement minute changes in the actuation of the accelerator pedal.

In this manner, with this second preferred embodiment of the present invention, the solenoid 89 of a directly acting type is provided to the base plate 83, and it is arranged to turn the solenoid 89 OFF when the risk potential RP is greater than the predetermined value RPa so that the solenoid pin 89a is removed away from the pedal plate 84, while it is arranged to turn the solenoid 89 ON when the risk potential RP is less than the predetermined value RPa so that the solenoid pin 89a is contacted against the pedal plate 84. Due to this, when the risk potential RP is large, the sliding of the pedal plate 84 is permitted, and along with the rotation of the pedal plate 84 the driver can easily feel the reaction force from the servo motor 70. By contrast, when the risk potential RP is small, the sliding of the pedal plate 84 is prohibited, so that the actuatability of the accelerator pedal is enhanced. At this time, the pedal plate 84 can only be rotated.

According to this second preferred embodiment of the accelerator pedal device of the present invention, in addition to the benefits obtained with the first preferred embodiment as described above, the following further benefits are also obtained.

(1) Since the solenoid 89 of the direct acting type is provided to the base plate 83, and it is arranged to prevent the sliding of the pedal plate 84 by this solenoid 89, thereby it becomes possible to provide a pedal structure which has enhanced actuatability.

(2) Since the solenoid is driven according to the risk potential RP, and it is arranged to prevent the sliding of the pedal plate 84 only when the risk potential RP drops below the predetermined value RPa, thereby, along with enhancing the pedal actuatability at normal times, during reaction force control, it is possible for the driver suitably to experience the risk.

The accelerator pedal device according to the present invention is not to be considered as being limited to the preferred embodiments described above; various variations are possible. In the above described preferred embodiments, the pedal portion 82 was provided so as to be both rotatable and also slidable with respect to the pedal lever 81, but it could also be provided, for example, so as only to be rotatable with respect thereto, or only to be slidable with respect thereto. Accordingly the pedal portion 82, which serves as a pedal member, is not limited to being made up from the base plate 83 and the pedal plate 84. If the pedal plate 84 is made only to be slidable, then, when the accelerator pedal is stepped upon, the pedal plate 84 is pulled by the rotation of the sole of the foot of the driver and is shifted in the downwards direction, so that the shifting in the upwards direction of the action point a like that shown in FIGS. 10A and 10B is moderated. As a result, not only is the shear or separating force reduced, but there is also a contribution to suppression of change in the length L of the moment arm.

Although in the above described second preferred embodiment the solenoid 89 of a direct acting type was used as the slide prevention means, it would also be possible to prevent sliding by some means other than the solenoid 89. Although in the above described second preferred embodiment the servo motor 70 was used as the reaction force application means, it would also be possible to apply reaction force using some other type of actuator. Moreover, rather than obtaining the hysteresis characteristic from the torsion spring 88, it would also be possible to obtain such a hysteresis characteristic by reaction force control of the servo motor.

The above described embodiments are examples, and various modifications can be made without departing from the spirit and scope of the invention.

The disclosure of the following priority application is herein incorporated by reference:

Japanese Patent Application No. 2002-180006 filed Jun. 20, 2002.

What is claimed is:

1. An accelerator pedal device comprising:
   a pedal lever rotatable with respect to a vehicle body of a vehicle;
   a pedal member configured to be actuated by being stepped upon by a driver;
   a rotation support device rotatably supporting the pedal member upon the pedal lever so that an angle subtended between the pedal lever and the pedal member is variable; and
   a reaction force application device configured to apply a reaction force applied to the pedal member via the pedal lever, wherein the applied reaction force is capable of being regulated according to a control signal generated by a controller and including information of detected risk potential associated with the vehicle, to convey information related to the detected risk potential to the driver, the reaction force application device including a servo motor with a hysteresis effect on the pedal member that is responsive to the control signal to control the reaction force applied to the pedal member.

2. An accelerator pedal device comprising:
   a pedal lever rotatable with respect to a vehicle body of a vehicle;
   a pedal member configured to be actuated by being stepped upon by a driver;
   a slide support device slidably supporting the pedal member upon the pedal lever so that a distance from a center of rotation of the pedal lever to the pedal member is variable; and
   a reaction force application device configured to apply a reaction force applied to the pedal member via the pedal lever, wherein the applied reaction force is capable of being regulated according to a control signal generated by a controller and including information of detected risk potential associated with the vehicle, to convey information related to the detected risk potential associated with the vehicle, to convey information related to the detected risk potential to the driver, the reaction force application device including a servo motor with a hystereis effect on the pedal member that is responsive to the control signal to control the reaction force applied to the pedal member.

3. An accelerator pedal device according to claim 2, further comprising a rotation support device that rotatably supports the pedal member upon the pedal lever so that an angle subtended between the pedal lever and the pedal member is variable.

4. An accelerator pedal device according to claim 3, wherein
the pedal member comprises a first pedal member that is rotatably supported upon the pedal lever, and a second pedal member that is slidably supported upon an upper surface of the first pedal member.

5. An accelerator pedal device according to claim 4, wherein
the first pedal member comprises a slide prevention device that prevents sliding of the second pedal member by contacting a member to the second pedal member and allows sliding of the second pedal member by leaving the member from the second pedal member.

6. An accelerator pedal device according to claim 2, further comprising
a slide prevention device that prevents sliding of the pedal member.

7. An accelerator pedal device according to claim 6, wherein:
the slide prevention device comprises a solenoid that drives a solenoid pin; and
the solenoid prevents sliding of the pedal member by contacting the solenoid pin to the pedal member.

8. An accelerator pedal device according to in claim 5, further comprising
a slide control device that calculates a degree of risk with respect to a subject vehicle or an environment of the subject vehicle and controls the slide prevention device so as to prevent sliding of the pedal member when the degree of risk is equal to or less than a predetermined value, and so as to allow sliding of the pedal member when the degree of risk exceeds the predetermined value.

9. An accelerator pedal device according to in claim 8, wherein
the slide prevention device calculates, based upon the running situation of the subject vehicle, a degree of proximity to a vehicle in front at the present time and a degree of influence upon the subject vehicle due to a trend of movement of the vehicle in front predicted in the future, and calculates the degree of risk based upon the calculated degree of proximity and the degree of influence.

10. An accelerator pedal device comprising:
a pedal lever rotatable with respect to a vehicle body of a vehicle;
a pedal member configured to be actuated by being stepped upon by a driver;
a rotation support means for rotatably supporting the pedal member upon the pedal lever so that an angle subtended between the pedal lever and the pedal member is variable; and
a reaction force application means for applying a reaction force to the pedal member via the pedal lever, wherein the applied reaction force is capable of being regulated according to a control signal generated by a controller and including information of detected risk potential associated with the vehicle, to convey information related to the detected risk potential.

11. The accelerator pedal device of claim 1, wherein in the absence of the applied reaction force, the pedal device has a hysteresis characteristic when the pedal member is stepped upon.

12. The accelerator pedal device of claim 2, wherein in the absence of the applied reaction force, the pedal device has a hysteresis characteristic when the pedal member is stepped upon.

13. The accelerator pedal device of claim 10, wherein in the absence of the applied reaction force, the pedal device has a hysteresis characteristic when the pedal member is stepped upon.

14. The accelerator pedal device of claim 1, wherein:
a relative position between the pedal lever and the pedal member is set in a manner maintaining a constant relative position between the pedal member and a depressing point at which the driver applies a stepping force on the pedal member.

15. The accelerator pedal device of claim 2, wherein:
a relative position between the pedal lever and the pedal member is set in a manner maintaining a constant relative position between the pedal member and a depressing point at which the driver applies a stepping force on the pedal member.

16. The accelerator pedal device of claim 10, wherein:
a relative position between the pedal lever and the pedal member is set in a manner maintaining a constant relative position between the pedal member and a depressing point at which the driver applies a depressing force on the pedal member.

17. The accelerator pedal device of claim 14, wherein the reaction force is transmitted to the driver's foot via the depressing point.

18. The accelerator pedal device of claim 15, wherein the reaction force is transmitted to the driver's foot via the depressing point.

19. The accelerator pedal device of claim 16, wherein the reaction force is transmitted to the driver's foot via the depressing point.

20. A vehicle including the accelerator pedal device of claim 1.

21. A vehicle including the accelerator pedal device of claim 2.

22. A vehicle including the accelerator pedal device of claim 10.

23. A vehicle comprising:
a pedal lever rotatable with respect to a vehicle body of a vehicle;
a pedal member configured to be actuated by being stepped upon by a driver;
a rotation support device rotatably supporting the pedal member upon the pedal lever so that an angle subtended between the pedal lever and the pedal member is variable; and
a reaction force application device configured to apply a reaction force applied to the pedal member via the pedal lever, wherein the applied reaction force is capable of being regulated according to a control signal generated by a controller and including information of detected risk potential associated with the vehicle, to convey information related to the detected risk potential to the driver, the reaction force application device including a servo motor with a hysteresis effect on the pedal member that is responsive to the control signal to control the reaction force applied to the pedal member.

* * * * *